Oct. 24, 1933.  E. P. HAMMOND  1,931,726

MOUNTING

Filed Oct. 19, 1931

INVENTOR
Edward P. Hammond
BY Whittemore Hulbert
Whittemore & Belknap
ATTORNEYS

Patented Oct. 24, 1933

1,931,726

UNITED STATES PATENT OFFICE 1,931,726

MOUNTING

Edward P. Hammond, Detroit, Mich., assignor to Gemmer Manufacturing Company, Detroit, Mich., a corporation of Michigan Application October 19, 1931. Serial No. 569,829

4 Claims. (Cl. 74—79)

This invention relates to a mounting adapted more particularly for use in the securing of a steering gear housing to one of the frame members of a motor vehicle chassis.

One of the primary objects of this invention is to provide a mounting of the above mentioned character which will be adapted for use with a frame member of the box construction type.

A further object of this invention is to provide a mounting of the above mentioned character which will provide for adjustment of the housing to facilitate the proper angular positioning of the steering stem.

Numerous other objects and advantages of this invention will become more apparent as the following description proceeds, particularly when reference is had to the accompanying drawing, wherein.

Figure 1:
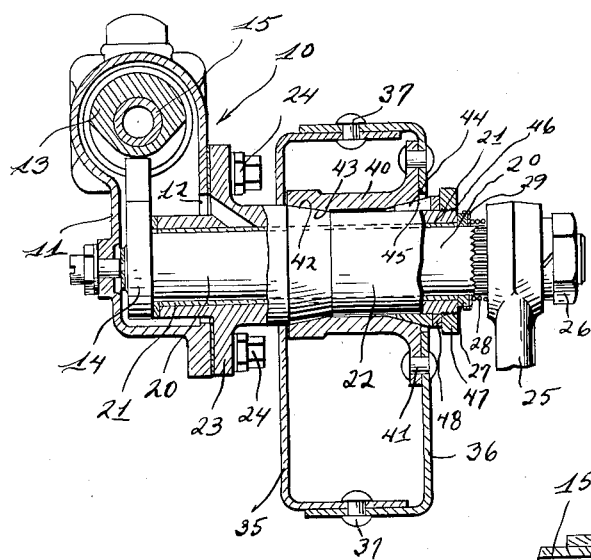
Fig. 1 is a sectional view with parts broken away of a steering gear housing and a mounting constructed in accordance with the teachings of this invention securing this housing to a frame member.
Figure 2:
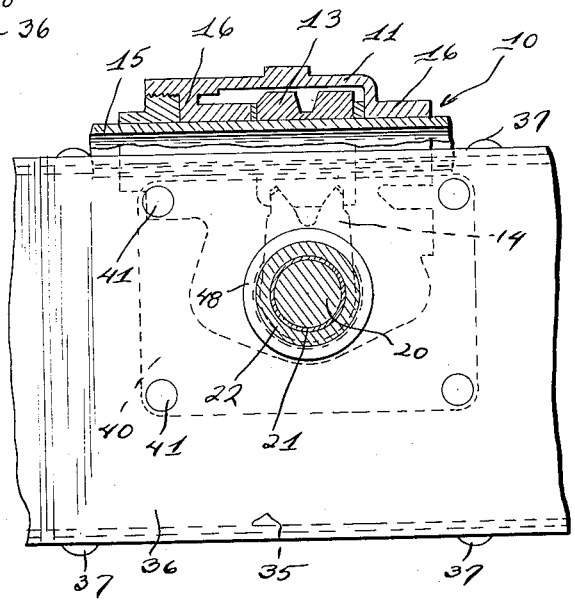
Fig. 2 is a sectional view with parts broken away taken substantially on the line 2—2 of Fig. 1.

Referring then particularly to the drawing wherein like reference characters designate corresponding parts throughout all views, the reference character 10 designates generally a steering gear housing. This housing comprises a body portion 11 provided with an opening 12 of sufficient size to permit the passage into the housing of a worm 13 and a worm gear 14. The worm 13 is mounted upon the steering stem 15, which stem is journaled in bearings 16 in the body portion of the housing. The worm gear is fixed upon one end of a rock shaft 20 which is journaled in a bronze bearing bushing 21 which is mounted within a tubular extension 22 formed on a cap 23 which closes the opening 12. The cap member may be secured to the body portion of the housing by a series of studs and nuts or the like 24.

The rock arm 20 projects beyond the end of the tubular extension 22, and fixed to the end of this rock arm is a lever 25 which is connected to the front wheels of the vehicle in any suitable manner (not shown). A nut 26 is threaded on the end of the rock arm to fix the lever 25 on the same. A packing ring 27 is preferably sleeved on the rock shaft adjacent the outer end of the tubular extension and is yieldably held in engagement with the latter by a spring 28 which engages at its one end the lever 25 and at its other end a ring 29 which constitutes a holder for the packing ring. The packing ring thus serves to prevent lubricant from leaking outwardly beyond the outer end of the tubular extension.

The modern tendency in motor vehicle manufacture is to form the chasses of frame members of the box construction type, that is, frame members which are of closed cross sectional shape as distinguished from frame members of channel or like cross sectional shape. Such a frame member is illustrated in Fig. 1 of the drawing as comprising the channel members 35 and 36 having their legs fixed together in any desired manner as by the rivets 37. The present invention is directed more particularly to a mounting for fixedly securing the housing 10 to a frame member of this character while providing for adjustment of the housing to vary the angular positioning of the steering stem 15.

According to the teachings of this invention there is fixed to the channel member 36 a sleeve 40 which projects interiorly of the frame member to a position adjacent the web of the channel member 35. The sleeve 40 may be fixed to the inner face of the web or base of the channel member 36 in any desired manner as, for example, by the rivets 41.

The sleeve 40 is tubular and is adapted to receive the tubular extension 22. The latter is provided adjacent its inner end with a cone-shaped shoulder 42, and the sleeve 40 is provided at its free end with a cone-shaped socket 43 adapted to snugly receive the shoulder 42. At its other end the sleeve 40 is provided with a cone-shaped socket 44 cut at a greater angle than the socket 42 and adapted to receive a split wedging ring 45. The inner surface of this ring is circular to snugly engage the tubular extension 22 while the outer surface of the ring is inclined to snugly engage the surface of the socket 44.

The tubular extension 22 projects entirely through the frame member and is provided on its outer free end with the threaded portion 46 for receiving a nut 47. A ring 48 sleeved on the tubular extension between the nut and the wedging ring 45 tends to force the latter inwardly into the socket 44 when the nut 47 is tightened.

As brought out before, the socket 44 is preferably cut on a greater angle than is the socket 43. In actual practice it has been found preferable to cut the wall of socket 43 at an inclination of approximately 10° and the wall of the socket 44 at an inclination of approximately 15°, it being understood that the cone-shaped shoulder of the tubular extension and the wedge ring are formed to snugly engage these sockets. When the sockets are formed in this manner it will be found that the cone-shaped shoulder will be more forcibly drawn into engagement with the socket 43 and there will be less likelihood of the connection between the sleeve and the tubular extension becoming loose.

In use, the sleeve 40 is secured to the channel member 36 prior to the fixing of the legs of this channel member to the legs of channel member 35. The tubular extension on the steering gear housing is inserted through the sleeve 40, and the lever 25 is then secured to the end of the rock shaft 20. Before the nut 47 is tightened, the tubular extension may be rotated within the sleeve 40 to angularly adjust the housing 10 about the axis of the tubular extension and to thus properly angularly position the steering stem 15.

When the steering stem has been properly angularly positioned, the nut 47 may be tightened, with the result that the cone-shaped shoulder 42 will be drawn into snug engagement with the socket 43. At the same time the wedge ring 45 will be forced into the socket 44 and will not only be thus firmly engaged with the socket, but will be contracted and thus forced into firm engagement with the outer periphery of the tubular extension. Thus the tubular extension will be rigidly locked or secured within the sleeve 40, and the housing will be fixedly connected to the chassis frame member.

Figure 3:
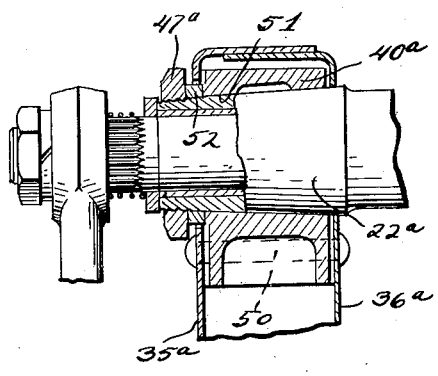
Fig. 3 is a view similar to Fig. 1 showing a slightly modified form of construction.

In Fig. 3 a slightly modified form of construction is disclosed in which the tubular extension on the housing is tapered throughout its entire length, and the sleeve is correspondingly formed to receive this tapered portion of the extension. Referring then particularly to this figure, the reference characters 35ª and 36ª designate channel members which are secured together to form a frame member of the box type. Fixed within this frame member as by bolts or the like 50 is the sleeve 40ª.

It will be noted that the tubular extension 22ª has its outer surface tapered, being of larger cross sectional area adjacent the housing (not shown). The sleeve 40ª is provided with an opening or socket 51 complementary in shape to the outer surface of the tubular extension for receiving the latter. The tubular extension may be locked in the sleeve by virtue of a nut 47ª which is threaded on the free end of the extension, this nut engaging a suitable split washer ring 52 which in turn engages the sleeve 40ª.

In use, it will be apparent that the tubular extension may be extended through the sleeve and rotatably adjusted therein until the nut 47ª is tightened. When the housing has been properly angularly positioned, the nut 47ª may be tightened on the free end of the tubular extension which will effect a clamping of the tubular extension in the sleeve to thus firmly hold the housing in adjusted position.

While the invention has been described with some detail, it is to be understood that the description is for the purposes of illustration only and is not definitive of the limits of the inventive idea. The right is reserved to make such changes in the details of construction and arrangement of parts as will fall within the purview of the attached claims.

What I claim as my invention is:

1. In combination, a steering gear housing having a tubular extension, said extension being provided with a cone-shaped shoulder adjacent its inner end, a box frame member, a sleeve fixed to the box frame member and projecting interiorly thereof, said sleeve being arranged to receive the tubular extension of said housing and being provided with a pair of cone-shaped sockets one of which is arranged to engage the cone-shaped shoulder on the extension, and means including a split wedge ring engageable in the other cone-shaped socket of the said sleeve for clamping the said tubular extension in the said sleeve.

2. In combination, a steering gear housing having a tubular extension, a box frame member, a sleeve fixed to said box frame member and projecting interiorly thereof, said sleeve being provided adjacent its free edge with a cone-shaped socket adapted to engage a cone shaped shoulder formed on the said extension, said sleeve being provided adjacent its other end with a second cone-shaped socket, the wall of which is formed at a greater inclination than the wall of the first mentioned cone-shaped socket, a split wedge ring mounted in the second mentioned cone-shaped socket of the sleeve and engageable with the outer surface of the tubular extension, and means including a clamping nut threaded on the tubular extension for forcing the wedge ring into the socket to clamp the tubular extension in the said sleeve.

3. In combination, a steering gear housing having a tubular extension, said extension being provided with a cone-shaped shoulder, a frame member, a sleeve fixed to the frame member, said sleeve being arranged to receive the tubular extension of said housing and being provided with a pair of cone-shaped sockets one of which is arranged to engage the cone-shaped shoulder on the extension, and means including a split wedge ring engageable in the other cone-shaped socket of the said sleeve for clamping the tubular extension in the said sleeve.

4. In combination, a box frame member formed of channel members having their legs secured together, a steering gear housing having a tubular extension projecting through the webs of said channel members, a sleeve fixed to the web of one of said channel members and projecting interiorly of said box frame member for receiving the tubular extension on the housing, and means accessible exteriorly of the box frame member for clamping the tubular extension of the housing in the said sleeve.

EDWARD P. HAMMOND.